(12) United States Patent
Frydkjaer et al.

(10) Patent No.: US 12,320,330 B2
(45) Date of Patent: Jun. 3, 2025

(54) METHOD FOR PRODUCING A WIND TURBINE, A METHOD FOR DEMOUNTING A MODULE, A NACELLE STRUCTURE AND A WIND TURBINE

(71) Applicant: Siemens Gamesa Renewable Energy A/S, Brande (DK)

(72) Inventors: John Frydkjaer, Struer (DK); Henrik Rahn, Herning (DK); Kenneth Svendsen, Silkeborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 532 days.

(21) Appl. No.: 17/608,171

(22) PCT Filed: Mar. 26, 2020

(86) PCT No.: PCT/EP2020/058494
§ 371 (c)(1),
(2) Date: Nov. 2, 2021

(87) PCT Pub. No.: WO2020/224865
PCT Pub. Date: Nov. 12, 2020

(65) Prior Publication Data
US 2022/0220941 A1 Jul. 14, 2022

(30) Foreign Application Priority Data
May 9, 2019 (EP) ...................................... 19173543

(51) Int. Cl.
*F03D 13/10* (2016.01)
*F03D 80/80* (2016.01)

(52) U.S. Cl.
CPC ............. *F03D 13/10* (2016.05); *F03D 80/80* (2016.05); *F05B 2230/604* (2013.01); *F05B 2230/70* (2013.01); *F05B 2240/912* (2013.01)

(58) Field of Classification Search
CPC .... F03D 13/10; F03D 80/80; F05B 2230/604; F05B 2230/70; F05B 2230/61; F05B 2240/912
See application file for complete search history.

(56) References Cited

U.S. PATENT DOCUMENTS

2003/0071469 A1   4/2003  Becker
2012/0146335 A1   6/2012  Bywaters et al.
(Continued)

FOREIGN PATENT DOCUMENTS

CN   201531379 U   7/2010
CN   102906420 A   1/2013
(Continued)

OTHER PUBLICATIONS

PCT International Search Report & Written Opinion mailed Jun. 29, 2020 corresponding to PCT International Application No. PCT/EP2020/058494.

*Primary Examiner* — Moshe Wilensky
(74) *Attorney, Agent, or Firm* — Schmeiser, Olsen & Watts LLP (57) ABSTRACT

Provided is a method for producing a wind turbine, the method including the steps of: a) providing a nacelle structure, b) providing a module to be mounted to the nacelle structure in a hanging position, and c) moving the module relative to the nacelle structure and at least partially through the nacelle structure at an erection site until the module is in the hanging position on the nacelle structure. This has the advantage that the transport of the nacelle structure and the module may be conducted not in hanging position. Thus, a height of the nacelle structure during transport can be lowered.

7 Claims, 7 Drawing Sheets

(56) References Cited

U.S. PATENT DOCUMENTS

2018/0335023 A1  11/2018  Trede
2022/0154696 A1   5/2022  Mortensen et al.

FOREIGN PATENT DOCUMENTS

| | | |
|---|---|---|
| CN | 103502636 A | 1/2014 |
| CN | 104405586 A | 3/2015 |
| CN | 106640531 A | 5/2017 |
| CN | 107218181 A | 9/2017 |
| CN | 108953063 A | 12/2018 |
| DE | 10 2007 062622 A1 | 6/2009 |
| DE | 10 2008 051274 B3 | 6/2010 |
| EP | 1101934 A2 | 5/2001 |
| EP | 3 276 169 A1 | 1/2018 |

METHOD FOR PRODUCING A WIND TURBINE, A METHOD FOR DEMOUNTING A MODULE, A NACELLE STRUCTURE AND A WIND TURBINE

CROSS-REFERENCE TO RELATED APPLICATIONS

This application claims priority to PCT Application No. PCT/EP2020/058494, having a filing date of Mar. 26, 2020, which claims priority to EP Application No. 19173543,0, having a filing date of May 9, 2019, the entire contents both of which are hereby incorporated by reference.

FIELD OF TECHNOLOGY

The following relates to a method for producing a wind turbine. Further, the following relates to a method for demounting a module from a hanging position on a nacelle structure of a wind turbine. Furthermore, the following relates to a nacelle structure for a wind turbine. Moreover, the following relates to a wind turbine comprising such a nacelle structure.

BACKGROUND

Modern wind turbines typically comprise a tower supporting a nacelle located at an upper end of the tower. Further, the wind turbine comprises a rotor connected to a generator which is arranged inside the nacelle. The rotor typically comprises three rotor blades.

The nacelle of the wind turbine may comprise a transformer module. Usually, such modules are mounted on the nacelle at an operation position of the module at the production site. This nacelle may be transported to an erection site accordingly and connected to the tower by a crane. A change of the position of the transformer module at the nacelle is not intended when assembling the wind turbine.

SUMMARY

An aspect relates to an improved method for producing a wind turbine.

Accordingly, a method for producing a wind turbine is provided. The method comprises the steps of: a) providing a nacelle structure, b) providing a module to be mounted to the nacelle structure in a hanging position, and c) moving the module relative to the nacelle structure and at least partially through the nacelle structure at an erection site until the module is in the hanging position on the nacelle structure.

This has the advantage that the transport of the nacelle structure and the module may be conducted not in hanging position. Thus, a height of the nacelle structure during transport can be lowered. Further, achieving the hanging position of the module is facilitated.

"Hanging position" means that the module protrudes from the nacelle structure, e.g., downwards. The nacelle structure, for example, is comprised by the nacelle. In an embodiment, the nacelle structure is a nacelle rear module which forms a rear overhang with respect to the tower, wherein a hub of the wind turbine forms a front overhang with respect to the tower. In an embodiment, the nacelle structure comprises a support structure, in particular a lattice structure, and a plurality of modules which are fixed to the support structure. The plurality of modules may comprise, for example, an overvoltage protection box and/or a cooling pump and/or a fire blanket and/or a fire extinguisher and/or a control cabinet for aviation light and/or a converter module and/or a choking coil.

"Moving the module relative to the nacelle structure" means that a relative movement between the module and the nacelle structure is provided. This can be conducted by moving actively the nacelle structure, in particular by lifting with a crane, moving actively the module, in particular by its own weight force, or moving actively the module and the nacelle structure. "Through the nacelle structure" means that a volume which is defined or bordered by the nacelle structure is used. In an embodiment, the module is guided through the lattice structure.

"Erection site" means site of operation where energy is produced using the wind turbine.

This, for example, means that the module is not merely attached from the outside to the nacelle structure for achieving the hanging position. In an embodiment, the module is released from an inner volume of the nacelle structure for achieving the hanging position. In an embodiment, the module comprises a container which forms the exterior of the module. In particular, the module comprises a leader, stairs or the like (e.g., inside the container). This has the advantage that personnel can enter safely the hanging module. In particular, the steps a), b) and c) are performed in the listed order.

According to an embodiment, the module is a transformer module of the wind turbine.

"Transformer module" means that the module comprises a transformer. The wind turbine may comprise a generator which converts the wind's kinetic energy into electric energy. In an embodiment, the transformer module is electrically connected to the generator for transforming the electric energy. In particular, the transformer module comprises a container and a transformer which is arranged inside the container.

According to a further embodiment, the method comprises the step of transporting the module to the erection site inside the nacelle structure in a transporting position.

This has the advantage that the module can be transported space-saving. Therefore, when moving the module relative to the nacelle structure, a position change from inside to outside occurs since the module protrudes from the nacelle structure when the movement is finished.

Alternatively, the transformer module may be transported separately. This may be important when weight restrictions for transport must complied with. After separate transport of the module and the nacelle structure to the erection site, in a first step the nacelle structure may be lifted and connected to the tower. In a second step the module may be lifted and put through an opening of the support structure into the support structure. In a third step the module may be moved from the inside of the support structure into the hanging position.

According to a further embodiment, after step c) a volume occupied by the module in transporting position is used for a drive train portion of the wind turbine.

This means that the drive train portion is mounted instead of the module at the transporting position. The drive train portion may, for example, be connected to the generator and comprises a shaft and/or a transmission.

According to a further embodiment, step c) is executed by a guiding system which is provided at the nacelle structure.

In an embodiment, the guiding system guides the module at at least two, three, four or more corners of the container. The guiding system may comprise guiding pads, in particular two for each corner of the container. For example, guiding of the module may be conducted without any further tools inside the nacelle structure.

According to a further embodiment, step c) is executed by lifting the nacelle structure.

In an embodiment, the nacelle structure is lifted by the crane and simultaneously the nacelle structure is moved relative to the module. In this case the module stays at the same height, in particular on a ground or a trailer, while the support structure is lifted.

According to a further embodiment, step c) is executed after mounting the nacelle structure to a tower of the wind turbine.

In this case, the module is lowered down relative to the nacelle structure, in particular by its weight force. This can be executed by a cable, rope, chain, belt, or the like. The nacelle structure may be lifted and connected to the tower while the module is inside the nacelle structure (i.e., in transporting position) and connected thereto.

According to a further embodiment, step c) is completed when the module slides against an end stop which defines the hanging position of the module.

This has the advantage that the relative movement between the module and the support structure is limited, and a fixation downwards is provided. In an embodiment, the end stop comprises plates protruding lateral form the container and mounted thereto.

Further, a method for demounting a module from hanging position on a nacelle structure of a wind turbine is provided. The method comprises the steps of: a1) providing a lowering device inside the nacelle structure, b1) connecting the lowering device to the module from an inside of the nacelle structure,    c1) disconnecting the module from the nacelle structure, and    d1) lowering the module by the lowering device.

In particular, the steps a1), b1), c1) and d1) are performed in the listed order. This has the advantage that service operations, utilizing of the wind turbine or replacement of a hanging module is facilitated. In an embodiment, step a1) is conducted when the demand for exchanging the module or for dismounting the wind turbine arises. This means that such a lowering device is not provided inside the nacelle when the wind turbine is completely assembled at the erection site.

In an embodiment the lowering device comprises a hoist and/or winch. This has the advantage that no crane is needed when lowering the module. In particular, step c1) may comprise to release and remove the end stop. After removing the end stop, the module can be directly lowered down to the ground, trailer, vessel or the like.

Furthermore, a nacelle structure for a wind turbine is provided. The nacelle structure comprises a guiding system configured to guide a module towards a hanging position, wherein the nacelle structure is configured to hold the module in the hanging position.

The guiding system facilitates the step of providing the hanging position at the erection site. Further, the transport of the nacelle structure and the module to the erection site may be facilitated since the height of the nacelle structure during transport can be lowered.

According to a further embodiment, the module comprises an end stop configured to limit a movement of the module, in particular at the hanging position.

In an embodiment, the end stop comprises plates protruding lateral form the container and mounted thereto.

According to a further embodiment, the nacelle structure is configured to contain and to hold the module in a transporting position which is different from the hanging position.

In an embodiment, the transporting position is directly above the hanging position with respect to the nacelle structure. Therefore, a change of the position may be conducted by the weight force of the module.

According to a further embodiment, the guiding system is configured to guide the module from the transporting position to the hanging position.

In an embodiment, the guiding system centers the module when guiding the module downwards. The guiding system may comprise guiding pads, in particular two at each corner of the container.

According to a further embodiment, the guiding system is configured to guide the module such that the module has only one degree of freedom.

Thus, the module is guided along a determined trajectory, in particular along a straight. This has the advantage that the guiding step is fail-safe.

Moreover, a wind turbine comprising such a nacelle structure is provided.

The wind turbine may further comprise the module which is hold by the nacelle structure in hanging position. The wind turbine comprises a tower, a nacelle connected to the tower, a hub and blades connected to the hub. The nacelle structure may be comprised by the nacelle and may form a nacelle rear module which forms a rear overhang with respect to a tower of the wind turbine. The nacelle rear module is directly or indirectly connected to the tower.

"Wind turbine" presently refers to an apparatus converting the wind's kinetic energy into rotational energy, which may again be converted to electrical energy by the apparatus.

The embodiments and features described with reference to the method for producing a wind turbine of embodiments of the present invention apply mutatis mutandis to the method for demounting a module of embodiments of the present invention and the nacelle structure of embodiments of the present invention and vice versa.

The embodiments and features described with reference to the nacelle structure of embodiments of the present invention apply mutatis mutandis to the method for demounting a module of embodiments of the present invention and the method for producing a wind turbine of embodiments of the present invention and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
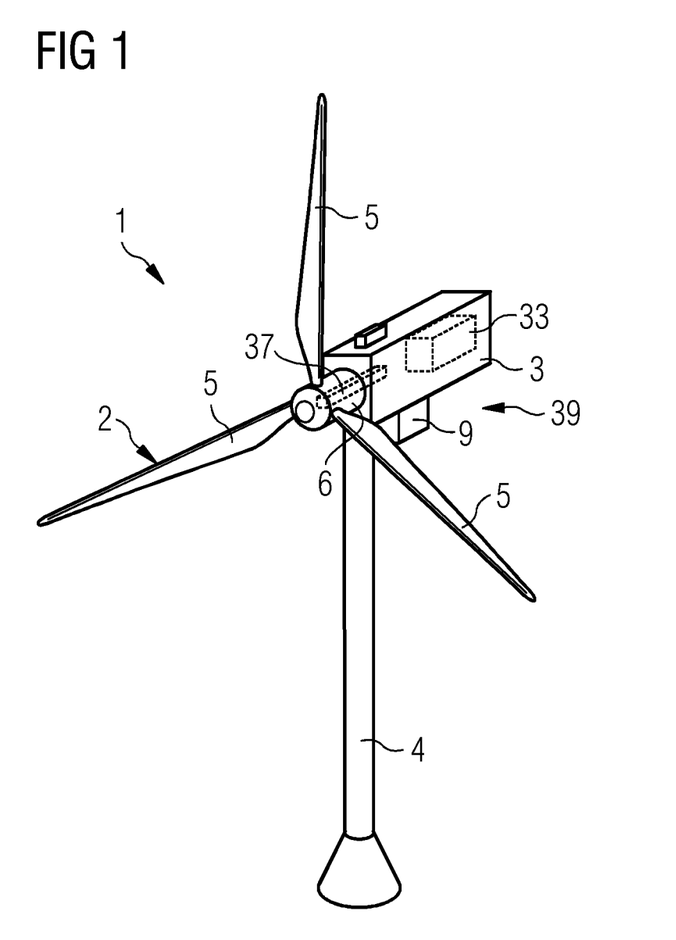
FIG. 1 shows a perspective view of a wind turbine according to one embodiment.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 200 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. The wind turbine 1 comprises a module 9 connected to the nacelle 3 in a hanging position 39.

Figure 2:
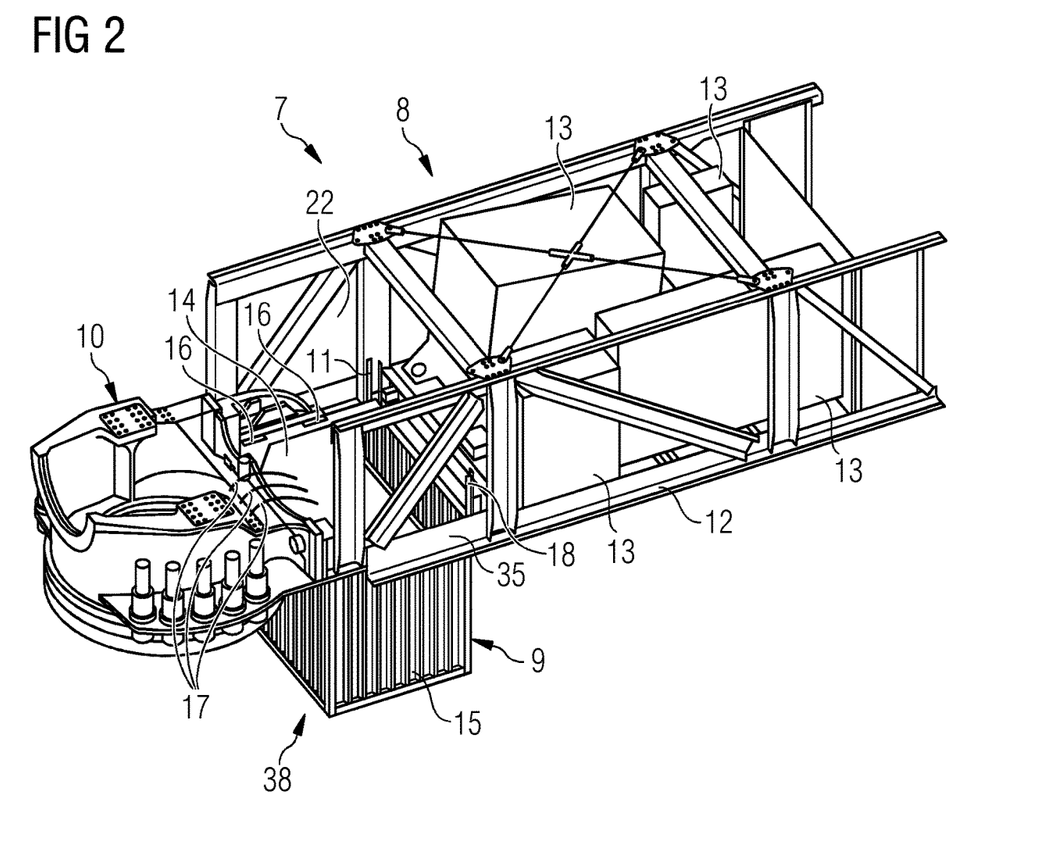
FIG. 2 shows a perspective view of a nacelle structure and a module of the wind turbine according to FIG. 1.

FIG. 2 shows a perspective view of a portion 7 of the nacelle 3 (see FIG. 1). The portion 7 comprises a nacelle structure 8, a module 9 and an interface 10 to the to the tower 4 (see FIG. 1). The nacelle structure 8 is connected to the tower 4 by the interface 10. The nacelle structure 8 holds the module 9 in the hanging position 39. The nacelle structure 8 comprises a guiding system 11 configured to guide a module 9 towards the hanging position 39.

In an embodiment the nacelle structure 8 is a nacelle rear module or rear end module of the nacelle 3. In an embodiment, the nacelle structure 8 comprises a support structure 12 and a plurality of modules 13 which are fixed to the support structure 12. In an embodiment, the support structure 12 is a lattice structure. The guiding system 11 is provided at the front portion which is near to the tower 4 (not shown).

The plurality of modules 13 may comprise, for example, an over voltage protection box and/or a cooling pump and/or a fire blanket and/or a fire extinguisher and/or a control cabinet for aviation light and/or a converter module and/or a choking coil.

The module 9 is a transformer module of the wind turbine 1. The transformer module comprises a transformer 14. The wind turbine 1 may comprise a generator which converts the wind's kinetic energy into electric energy (not shown). In an embodiment, the transformer 14 is electrically connected to the generator for transforming the electric energy. The generator may comprise a stator cabinet (not shown). In an embodiment, the module 9 comprises a container 15, wherein the transformer 14 is arranged inside the container 15. The container forms the exterior of the module 9. The container 15 is connected and fixed to the lattice structure 12 by install fasteners 16.

Further, connect main cables 17 may be provided from the tower 1 (see FIG. 1) to the transformer 14. Furthermore, connect busbars 18 electrically connected to the generator (e.g., stator cabinet) and/or a converter are provided (not shown). The busbars 18 are electrically connected to the transformer 14.

Figure 3:
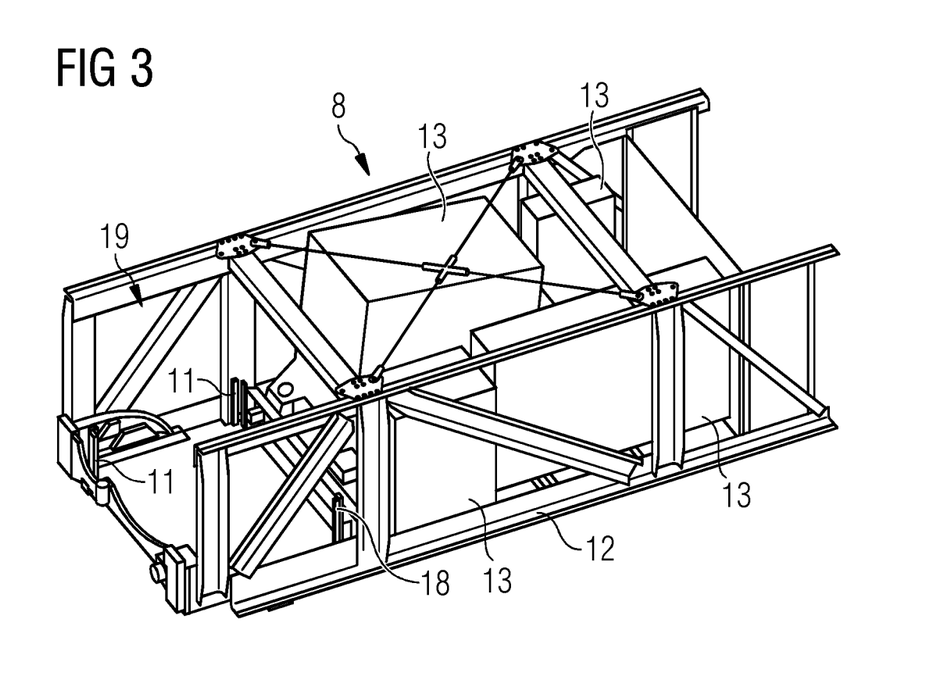
FIG. 3 shows a perspective view of the nacelle structure without the module.

FIG. 3 shows perspective view of the nacelle structure 8 with-out the module 9 and the interface 10. The nacelle structure 8 may comprise an upper opening 19. When providing the module 9 (see FIG. 2) separately from the nacelle structure 8 at the erection site, the module 9 can be inserted into the nacelle structure 8 through the opening 19 and inserted into the guiding system 11.

Figure 4:
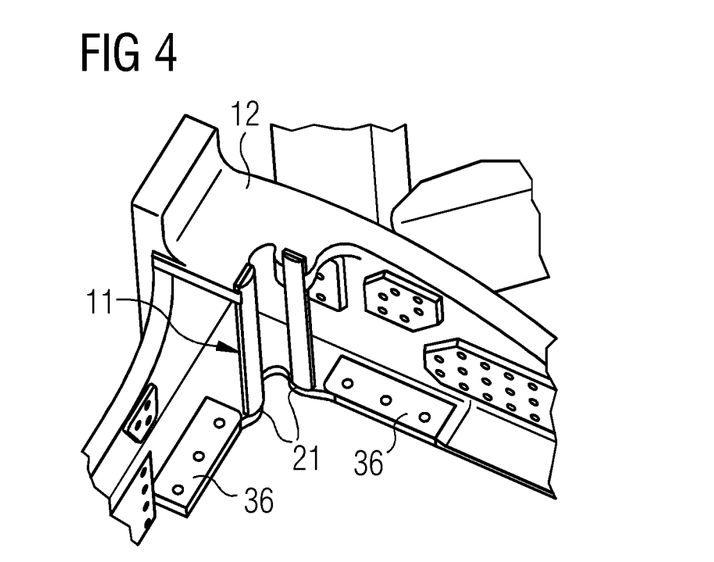
FIG. 4 shows perspective view of a guiding system of the nacelle structure according to FIG. 3.

FIG. 4 shows a perspective view of a portion of the guiding system 11. The guiding system 11 guides the module at at least two, three, four or more corners 20 of the container 15 (see FIG. 5). The guiding system 11 may comprise guiding pads 21, in particular low friction pads. For example, two of the guiding pads 21 support each corner 20 of the container 15. Each guiding pad 21 may have a longitudinal shape. The guiding pads 21 are connected to the lattice structure 12. Alternatively, the guiding pads 21 may be integrally formed with the lattice structure 12.

Figure 5:
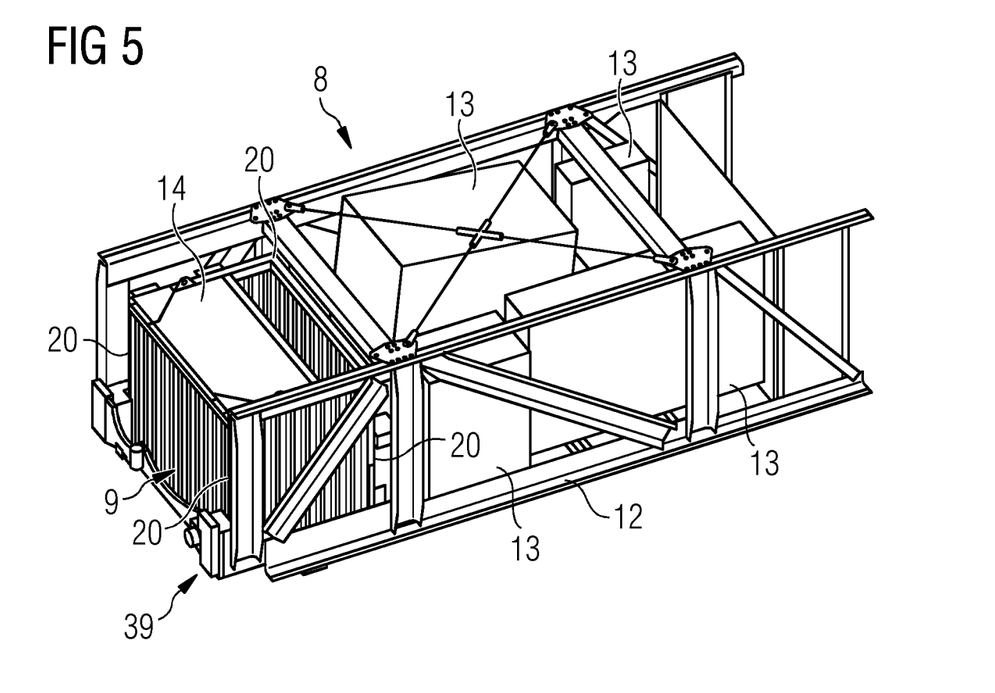
FIG. 5 shows a perspective view of the nacelle structure and the module, in particular in transporting position.

FIG. 5 shows a perspective view of the nacelle structure 8 and the module 9 arranged inside the nacelle structure 8. This is a possible transporting position 38 for the module 9. The nacelle structure 8 is configured to contain and to hold the module 9 in this transporting position 38 which is different from the hanging position 39 (see FIG. 2). When the module 9 is in the transporting position 38 it occupies a volume 22 (see FIG. 2) which may be used for installing other components of the wind turbine 1 after the module 9 is moved into the hanging position 39.

The module 9 may be mounted inside the nacelle structure 8 on a production line (not shown). The module 9 and the nacelle structure 8 may be fully assembled with cables and hose routing on the production line.

Figure 6:
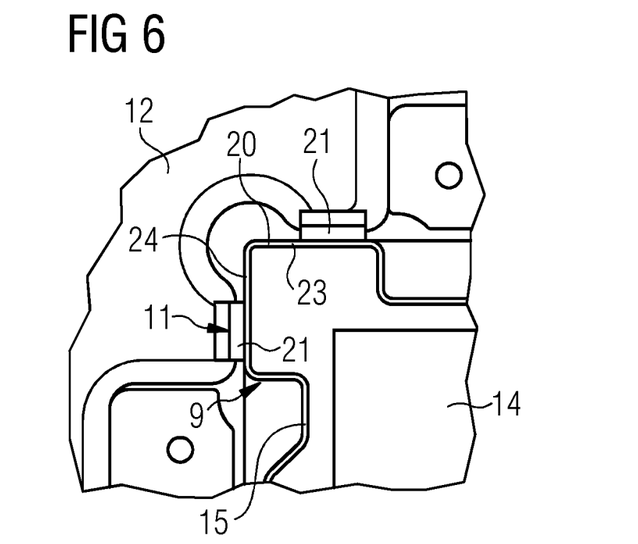
FIG. 6 shows a schematic top view portion from FIG. 6.

FIG. 6 shows a schematic top view portion from FIG. 5. The guiding system 11 is configured to guide the module 9 from the transporting position 38 to the hanging position 39. In an embodiment, the guiding system 11 centers the module 9 when guiding the module 9 downwards. The guiding system 11 may comprise two guiding pads 21 at each corner 20 of the container 15. Thus, the guiding system 11 is configured to guide the module 9 such that the module 9 has only one degree of freedom. As shown in FIG. 6, two guiding pads 21 are provided for one corner 20. The guiding pads 21 are orthogonally orientated to each other for aligning at walls 23, 24 of the container 15 which are also orthogonal to each other.

Figure 7:
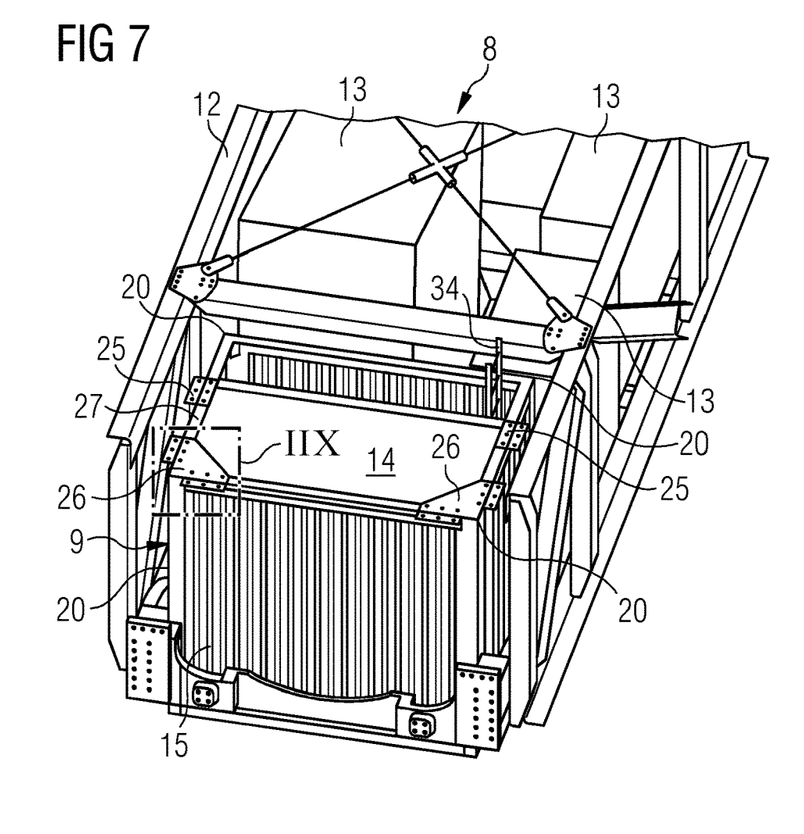
FIG. 7 shows a further perspective view of the nacelle structure and the module.

FIG. 7 shows a further perspective view of the nacelle structure 8 and the module 9. The module comprises end stops 25, 26 configured to limit a movement of the module 9, in particular at the hanging position 39. The end stops 25, 26 are mounted to a top side 27 of the container and protrude lateral form the container 15. As shown in FIG. 7 two rectangular plate-shaped end stops may be provided between the corners 20 and two plate-shaped end stops 26 may be mounted at adjacent corners 20. As shown in FIG. 4, the lattice structure 12 may comprise surfaces 36 for stopping the end stops 25, 26 when the module 9 is moved in the hanging position 39.

In particular, the module 9 comprises a leader 34, stairs or the like. This has the advantage that personnel can enter safely the hanging module 9.

Figure 8:
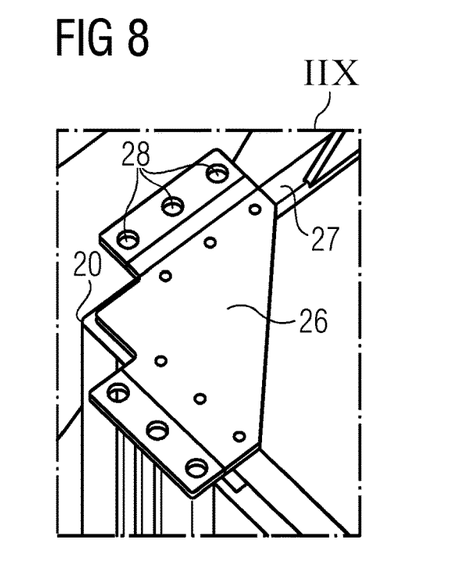
FIG. 8 shows a section IIX from FIG. 7.

FIG. 8 shows a section IIX from FIG. 7. The end stop 26 may be bolt to the top side 27. Holes 28 may be provided at the end stop 26 for connecting the end stop 26 to surfaces 36 (see FIG. 4) by bolts (not shown). The end stop 26 is adapted to the corner 20.

Figure 9:
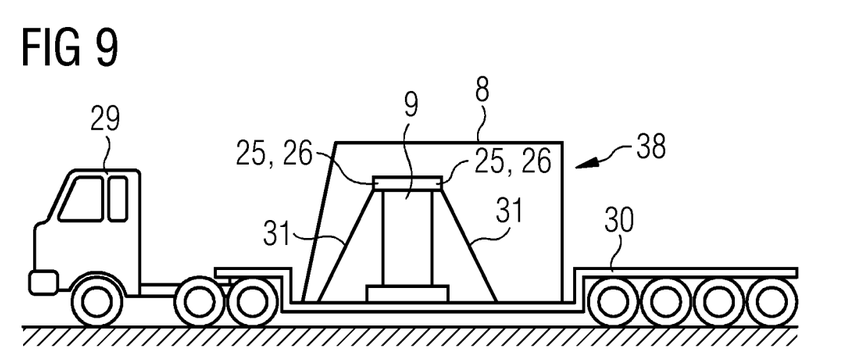
FIG. 9 shows schematically lifting of the nacelle structure of the wind turbine according to FIG. 1.
Figure 10:
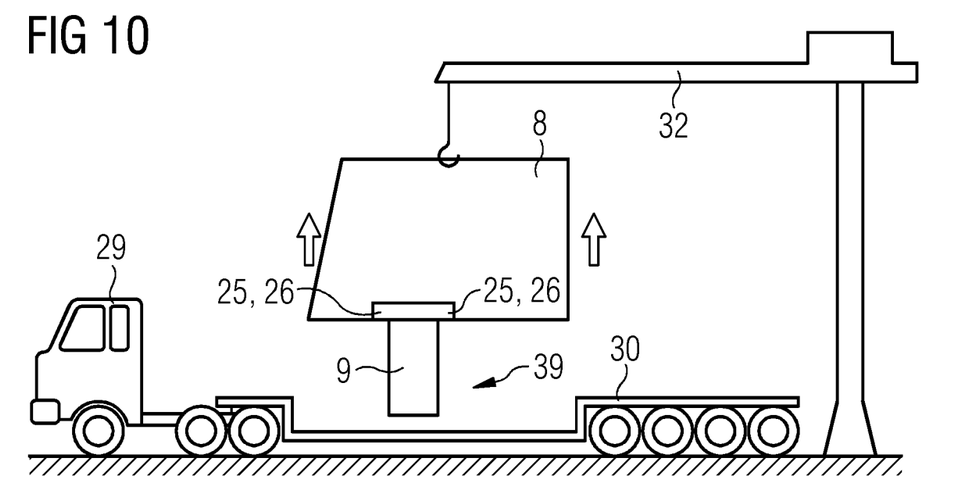
FIG. 10 shows schematically lifting of the nacelle structure of the wind turbine according to FIG. 1.

FIGS. 9 and 10 show schematically lifting of the nacelle structure 8 of the wind turbine 1 according to FIG. 1. The nacelle structure 8 is transported to the erection site by a truck 29 and a trailer 30 on which the nacelle structure 8 is supported. The module 9 is fixed inside the nacelle structure 9, in particular by ropes 31.

At the erection site the nacelle structure 8 is lifted (see arrows in FIG. 10) by a crane 32 and simultaneously the nacelle structure 8 is moved relative to the module 9 (see FIG. 10). In this case the module stays at the same height on the trailer 30 while the nacelle structure 8 is lifted.

Figure 11:
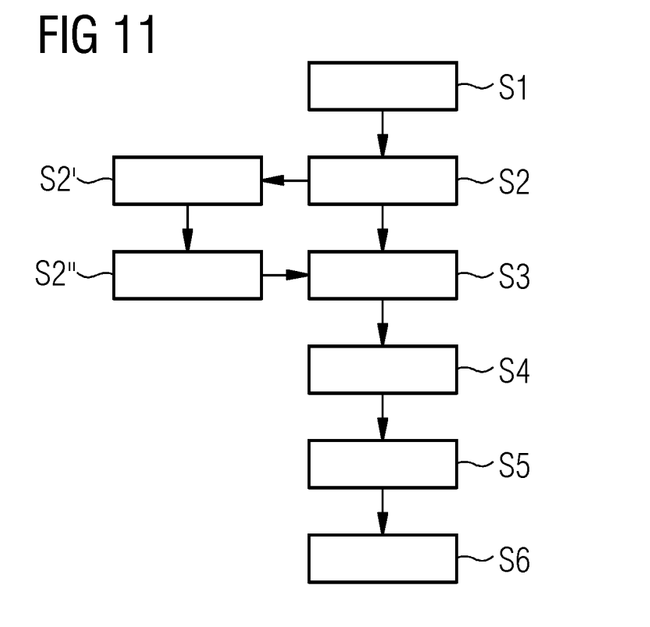
FIG. 11 shows a block diagram of a method for producing the wind turbine.

FIG. 11 shows a block diagram of a method for producing the wind turbine. In a step S1 the nacelle structure 8 is provided. This can be conducted by a trailer 30 (see FIG. 9), vessel or the like.

In a step S2 the module 9 is provided. The module 9 may be transported to the erection site inside the nacelle structure 8 in a transporting position 38 as shown in FIG. 9. This has the advantage that the module 9 can be transported space-saving.

Alternatively, the nacelle structure 8 and the module 9 may be provided separately to the erection site. This may be important when weight restrictions for transport must complied with. After separate transport of the module 9 and the nacelle structure 8 to the erection site, in a step S2' the nacelle structure 8 may be lifted and connected to the tower 4. In a step S2" the module 9 may be lifted and put through an opening 19 (see FIG. 3) of the nacelle structure 8 into the nacelle structure 8.

In a step S3 the module 9 is moved relative to the nacelle structure 8 and at least partially through the nacelle structure 8 at the erection site until the module 9 is in the hanging position 39 on the nacelle structure 8. Therefore, when moving the module 9 relative to the nacelle structure 8, a position change from inside to outside occurs since the module 9 protrudes from the nacelle structure when the movement is finished. In an embodiment, step S3 is executed by the guiding system 11 which is provided at the nacelle structure 8.

Step S3 may be executed directly after step S2 as shown in FIG. 10, i.e., by lifting the nacelle structure 8 while the module 9 stays at the same height. Alternatively, step S3 may be executed after step S2". In this case, the module 9 may be lowered down relative to the nacelle structure 8. This can be executed by a cable, rope, chain, belt, or the like (not shown).

As a further alternative to steps S2', S2" the nacelle structure 8 may be lifted and connected to the tower while the module 9 is inside the nacelle structure 8 and connected thereto (i.e., in transporting position).

Step S3 is completed when the module 9 slides against the end stops 25, 26 (see FIG. 7) which defines the hanging position 39 of the module 9. This has the advantage that the relative movement between the module 9 and the nacelle structure 8 is limited.

In a step S4 the module 9 is fixed to the support structure 12, in particular by install fasteners 16 (see FIG. 2) and/or bolts (not shown). In a step S5 tower cables 17 may be connected to the transformer 14.

In a step S6 the volume 22 occupied by the module 9 in transporting position 38 is used for a drive train portion 37 (see FIG. 1) of the wind turbine 1. This means that the drive train portion 37 is provided and installed in volume 22 (see FIG. 2). The drive train portion 37 may, for example, be connected to the generator and comprise a shaft and/or a transmission (not shown).

Figure 12:
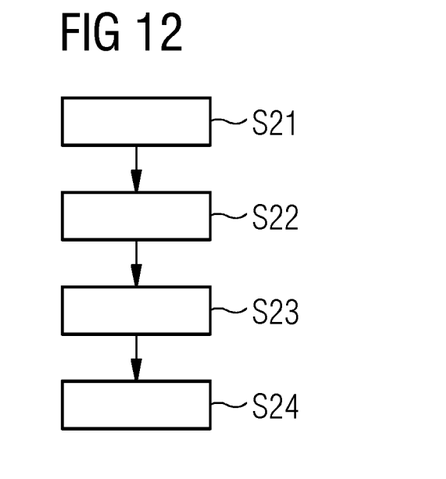
FIG. 12 shows a block diagram of a method for demounting the module from hanging position.

FIG. 12 shows a method for demounting the module 9 from hanging position 39 on the nacelle structure 8 of the wind turbine 1.

In a step S21 a lowering device 33 (see FIG. 1) is provided inside the nacelle structure 8. In an embodiment, step S21 is conducted when the demand for exchanging the module 9 or for dismounting the wind turbine 1 arises. In an embodiment, the lowering device 33 comprises a hoist and/or winch. This has the advantage that no crane is needed when lowering the module 9.

In a step S22 the lowering device 33 is connected to the module from an inside of the nacelle structure 8.

In a step S23 the module 9 is disconnected from the nacelle structure 8. In particular, S23 comprise to release and remove the end stops 25, 26.

In a step S24 the module 9 is lowered by the lowering device 33. The module 9 can be directly lowered down to the ground, trailer, vessel or the like.

This has the advantage that service operations, utilizing of the wind turbine 1 or replacement of a hanging module 9 is facilitated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for producing a wind turbine, the method comprising:
   a) providing a nacelle structure;
   b) providing a module to be mounted to the nacelle structure in a hanging position; and
   c) moving the module relative to the nacelle structure and at least partially through the nacelle structure at an erection site until the module is in the hanging position on the nacelle structure;
   wherein the module is transported to the erection site inside the nacelle structure in a transporting position.

2. The method according to claim 1, wherein the module is a transformer module of the wind turbine.

3. The method according to claim 1, wherein after step c) a volume occupied by the module in the transporting position is used for a drive train portion of the wind turbine.

4. The method according to claim 1, wherein step c) is executed by a guiding system which is provided at the nacelle structure.

5. The method according to claim 1, wherein step c) is executed by lifting the nacelle structure.

6. The method according to claim 1, wherein step c) is executed after mounting the nacelle structure to a tower of the wind turbine.

7. The method according to claim 1, wherein step c) is completed when the module slides against an end stop which defines the hanging position of the module.

* * * * *